Figure 1:
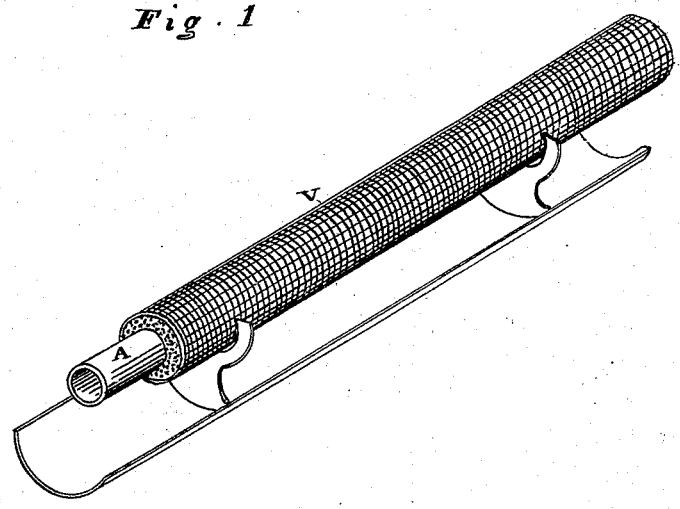

R. H. LUCAS.
PROCESS AND APPARATUS FOR DEHYDRATING AND REFRIGERATING AIR.

No. 184,291.                    Patented Nov. 14. 1876.

UNITED STATES PATENT OFFICE.

ROBERT H. LUCAS, OF SAN FRANCISCO, CALIFORNIA.

IMPROVEMENT IN PROCESSES AND APPARATUS FOR DEHYDRATING AND REFRIGERATING AIR.

Specification forming part of Letters Patent No. 184,291, dated November 14, 1876; application filed September 16, 1876.

*To all whom it may concern:*

Be it known that I, ROBERT H. LUCAS, of the city and county of San Francisco and State of California, have invented an Improved Method and Apparatus for Dehydrating and Refrigerating Air; and I do hereby declare the following to be a full, clear, and exact description.

My invention relates to refrigeration, or the art of preserving substances by surrounding them with cold air; and also to the production of an atmosphere or a column of air of an exceedingly low temperature, which may be caused to displace the heated air in mines and like places, for the purpose of reducing the temperature thereof, so that the mines can be worked in a more rapid manner, and with greater comfort and safety.

Two conditions are necessary in order to properly preserve animal and vegetable substances by the refrigeratory process. First, the air which surrounds the substances must be cold; and, secondly, it must be dry or free from moisture.

My improvement provides for accomplishing both of these conditions simultaneously in a simple and effective manner; and it consists in surrounding the pipes, through which a refrigerant gas is conducted, with any deliquescent salt, in combination with an air-forcing mechanism, which will cause the air which is to be dehydrated and cooled to come in contact with the salt, all as hereinafter described.

In mines and other places below the earth's surface the normal temperature of the air confined therein is often so great that it is impossible for miners and workmen to remain any great length of time in them unless some means for refrigeration and ventilation are used. In some of the mines of the precious metals, for instance, the temperature is reduced by the use of ice, that is carried down into the shafts and levels and placed in proximity to the miners, where a mixture of water and ammonia is poured over the mass to assist the process of cooling; but this method only produces a partial effect, and is attended, besides, with much discomfort and inconvenience to the workmen, for the vapors arising from the melting ice produces an atmosphere more or less humid, and the presence of the ammonia set free in the evaporation adds to this disagreeable condition of the air.

I find, however, that by blowing or forcing the air to be cooled over and in contact with pipes A, which are surrounded by a deliquescent salt, such as chloride of sodium, chloride of calcium, caustic potash, magnesium, or other equivalent deliquescent substance, and through which a refrigerant gas is caused to flow, I can not only cool the air to an exceedingly low temperature, but also extract the moisture from it, so that it will be better adapted for breathing purposes.

The action of the refrigerant gas within the pipes is to reduce the temperature of the air, which is blown over them, while the deliquescent salt extracts the moisture from the air, leaving it dry and cold. As the deliquescent salt receives the moisture it gradually dissolves, and must therefore be replaced as often as found desirable.

In order to retain the salt in its proper position around the pipes, I construct a netting or wire-gauze tube, V, of larger diameter than the pipe, and this tube I support by suitable means around the pipe; I then fill the space between the pipes A and the surrounding perforated or gauze tube with the deliquescent salt to be used. I shall probably use chloride of sodium—common salt—for packing around the gas-tube. It will then be evident that if air be forced against and in contact with this pipe, the cooling agency of the contained circulating refrigerant gas will reduce its temperature, while the salt will extract the moisture, thus producing an atmospheric condition which is highly valued, not as a breathing medium, but which is indispensable in properly preserving animal and vegetable substances in a fresh condition.

Various methods of arranging the pipes for conducting the gas, and any volatile substance, such as is used in ice-machines for producing a refrigerant effect, can be used in connection with my improved refrigerator. These can be easily supplied and arranged by any person familiar with such machines in general.

Having thus described my invention, what I claim, and desire to secure by Letters Patent, is—

1. The process of refrigerating and dehydrating air by passing it over and in contact with a deliquescent salt, which is kept cool by artificial means, substantially as specified.

2. The process of cooling and dehydrating air, consisting in passing it over pipes, through which a refrigerant gas is caused to circulate, and around which a layer of deliquescent salt is supported, substantially as above described.

3. The skeleton or open-work tube V, surrounding the pipe A, so as to provide a space between said tube and the inside pipe, in which a deliquescent substance can be retained in contact with the pipe A, and allow the passing air to come in contact with it, substantially as and for the purpose described.

In witness whereof I have hereunto set my hand and seal.

ROBERT H. LUCAS. [L. S.]

Witnesses:
  OLWYN T. STACY,
  FRANK A. BROOKS.